United States Patent [19]

Takayama et al.

[11] 4,196,246
[45] Apr. 1, 1980

[54] ANTI-REFLECTION FILM FOR SYNTHETIC RESIN BASE

[75] Inventors: Hidetaka Takayama, Chiba; Hideo Ikeda, Kamakura, both of Japan

[73] Assignee: Nippon Kogaku K.K., Tokyo, Japan

[21] Appl. No.: 809,102

[22] Filed: Jun. 22, 1977

[30] Foreign Application Priority Data

Jun. 23, 1976 [JP] Japan ............................ 51-73104
Feb. 25, 1977 [JP] Japan ............................ 52-19171

[51] Int. Cl.² .................... B32B 27/06; G02B 1/10
[52] U.S. Cl. ............................ 428/213; 350/164; 350/165; 350/166; 427/164; 427/166; 428/448; 428/336; 428/451; 428/913
[58] Field of Search ............ 350/164, 165, 166; 427/164, 165, 166; 428/221, 332, 448, 451, 539, 336, 913

[56] References Cited

U.S. PATENT DOCUMENTS

| | | | |
|---|---|---|---|
| 3,781,090 | 12/1963 | Sumita | 350/164 |
| 3,799,653 | 3/1974 | Ikeda | 350/164 |
| 3,854,796 | 12/1974 | Thelen | 350/164 |
| 3,914,023 | 10/1975 | Thelen | 350/164 |
| 3,984,581 | 10/1976 | Dobler et al. | 350/164 X |

Primary Examiner—George F. Lesmes
Assistant Examiner—R. Eugene Varndell, Jr.
Attorney, Agent, or Firm—Shapiro and Shapiro

[57] ABSTRACT

Anti-reflection film for a synthetic resin base comprises a first layer of silicon dioxide ($SiO_2$) deposited on the synthetic resin base by evaporation, a second layer of alumina ($Al_2O_3$) deposited on the first layer by evaporation, and a third layer of silicon dioxide ($SiO_2$) or magnesium fluoride ($MgF_2$) deposited on the second layer by evaporation. The first layer has a geometrical film thickness of 1 to 5 $\mu$, the second layer has an optical film thickness of $\lambda/4$, and the third layer has an optical film thickness of $\lambda/4$.

16 Claims, 32 Drawing Figures

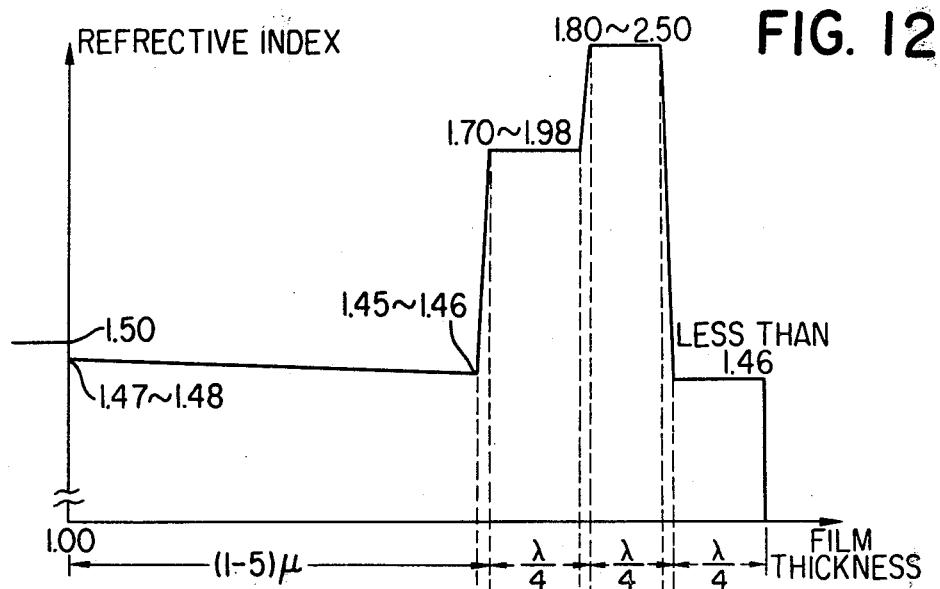
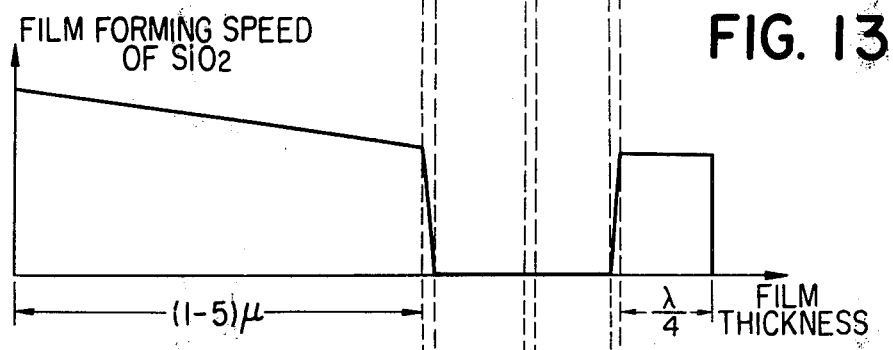
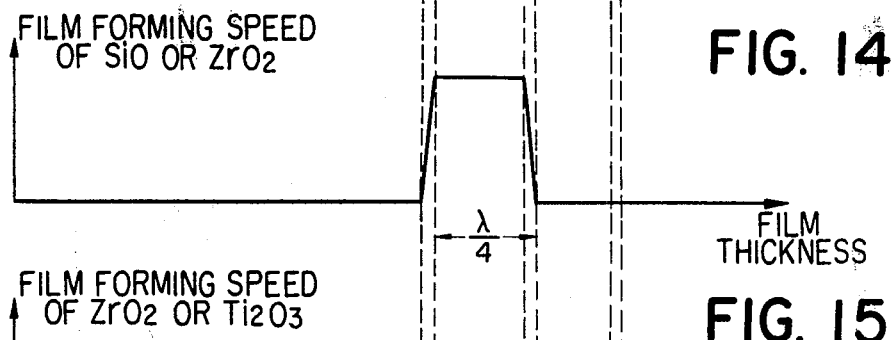
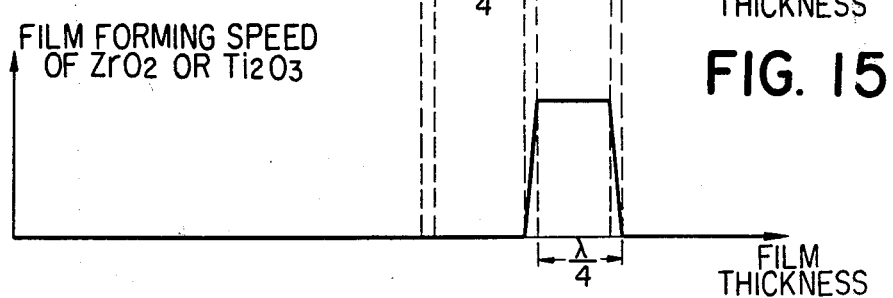

ANTI-REFLECTION FILM FOR SYNTHETIC RESIN BASE

BACKGROUND OF THE INVENTION

1. Field of the Invention

This invention relates to anti-reflection film for a synthetic resin base.

2. Description of the Prior Art

The heretofore known anti-reflection films for a synthetic resin base are poor in spectral reflection factor and low in mechanical strength and adherence property, and moreover are poor from the standpoint of aging.

SUMMARY OF THE INVENTION

The present invention has, for its object, to provide anti-reflection film for a synthetic resin base which has a good spectral reflection factor, high mechanical strength and which has good aging and adherence properties.

A technique is known which comprises depositing by evaporation on a base a thick film having a refractive index continuously varying in the direction of the thickness thereof, to equalize the refractive index of that portion of the thick film which is in contact with the base to the refractive index of the base, and varying the refractive index of the thick film in the direction of thickness thereof. It is also known that an optical member comprising such thick film and such base is optically equivalent to a base having the refractive index of the thick film at that side thereof which is adjacent the atmosphere.

The present invention utilizes the above-described technique to provide anti-reflection film in which one or two layers of quartz ($SiO_2$), alumina ($Al_2O_3$), titanium monoxide (TiO), titanium dioxide ($TiO_2$), titanium trioxide ($Ti_2O_3$), zirconium oxide ($ZrO_2$), indium oxide ($In_2O_3$), silicon dioxide ($SiO_2$), cerium dioxide ($CeO_2$), etc., are formed on a synthetic resin base such as CR-39, acryl, polycarbonate or the like, by vacuum evaporation or other film formation method.

According to the present invention, there is provided anti-reflection film for a synthetic resin base comprising a first layer formed of silicon dioxide ($SiO_2$) deposited on the synthetic resin base by evaporation, the first layer having a geometrical film thickness of 1 to 5$\mu$, a second layer formed of alumina ($Al_2O_3$) deposited on the first layer by evaporation, the second layer having an optical film thickness of $\lambda$4, and a third layer formed of silicon dioxide ($SiO_2$) or magnesium fluoride ($MgF_2$) deposited on the second layer by evaporation the third layer having an optical film thickness of $\lambda$4.

The invention will become more fully apparent from the following detailed description thereof taken in conjunction with the accompanying drawings.

BRIEF DESCRIPTION OF THE DRAWINGS

FIG. 12 illustrates the relationship between the refractive index and the film thickness in the third embodiment.

FIGS. 13, 14 and 15 illustrate the relationships between the film thickness and the film material in the third embodiment.

DESCRIPTION OF THE PREFERRED EMBODIMENTS

Figure 1:
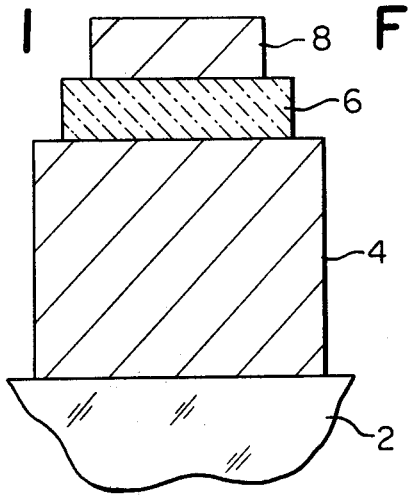
FIG. 1 shows the structure according to a first embodiment of the present invention.
Figure 6:
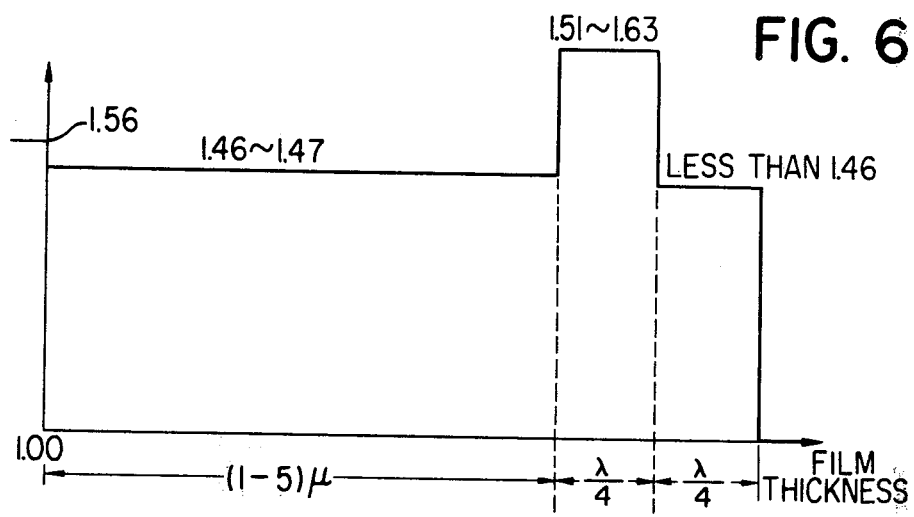
FIG. 6 illustrates the relationship between the refractive index and the film thickness in the first embodiment.
Figure 7:
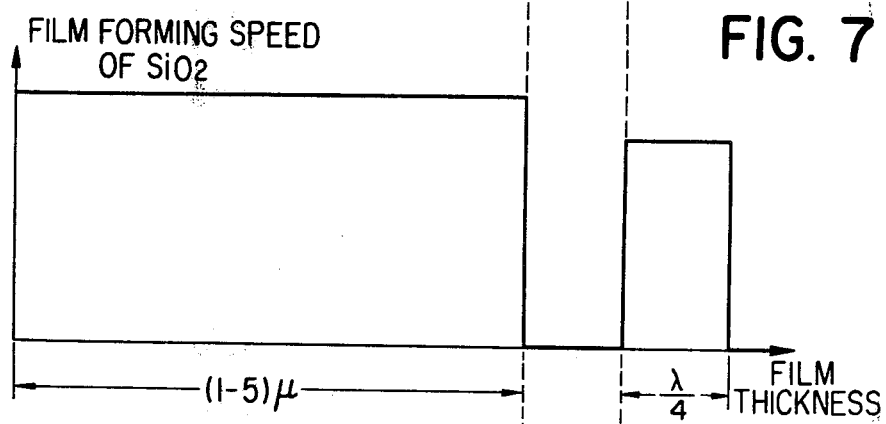
FIGS. 7 and 8 illustrates the relationships between the film thickness and the film forming speed of the film material in the first embodiment.
Figure 8:
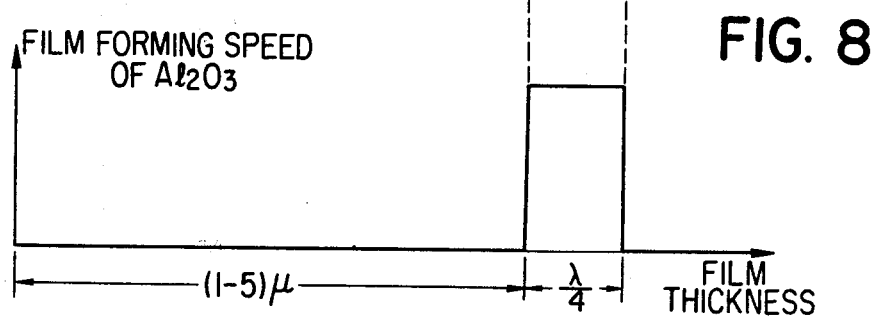
Figure 9:
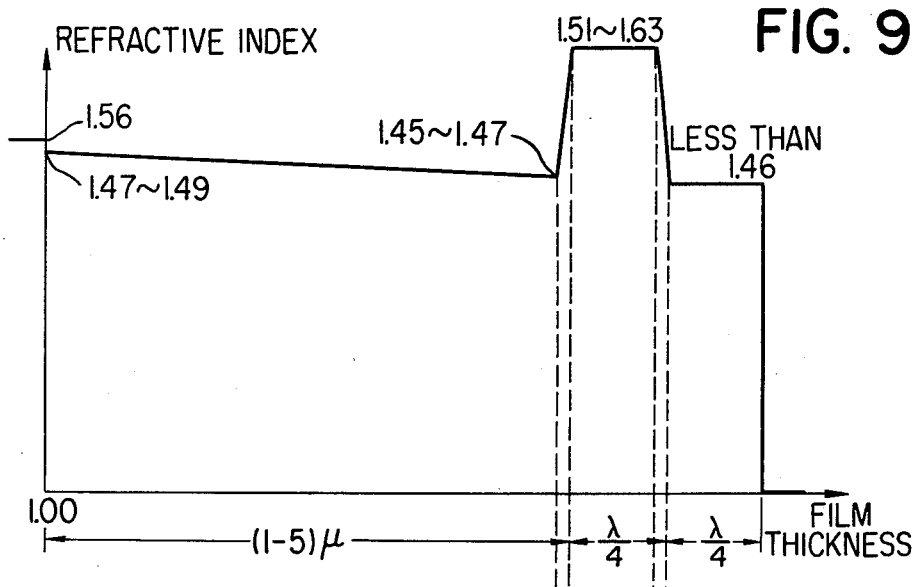
FIG. 9 illustrates the relationship between the refractive index and the film thickness in the second embodiment.

The structure according to a first embodiment of the present invention is shown in FIG. 1, the relationship between the refractive index and the film thickness in this embodiment is illustrated in FIG. 6, the relationship between the film forming speed of silicon dioxide ($SiO_2$) and the film thickness in this embodiment is illustrated in FIG. 7, and the relationship between the film forming speed of alumina ($Al_2O_3$) and the film thickness in this embodiment is illustrated in FIG. 8.

Any embodiment of the present invention employs CR-39 as the synthetic resin base.

CR-39 base 2 is cleaned, whereafter under a pressure of $5 \times 10^{-5}$ Torr and at a rate of 10 to 50 Å/sec. with the temperature of the base material at 120° C. or below, silicon dioxide ($SiO_2$) is deposited on the base as by vacuum evaporation until it forms a film of geometrical thickness of 1–5$\mu$, as shown in FIG. 7, thereby providing a first layer 4 of great thickness.

After the formation of the film of silicon dioxide ($SiO_2$) has ceased, alumina ($Al_2O_3$) is subsequently formed into a film of optical thickness $\lambda$/4 ($\lambda$=450–580 m$\mu$ throughout this specification) on the thick film of silicon dioxide ($SiO_2$), thereby providing a second layer 6, as shown in FIG. 8. The refractive index of alumina ($Al_2O_3$) is 1.51 to 1.63.

After the formation of the film of alumina ($Al_2O_3$) has ceased, a film of silicon dioxide ($SiO_2$) is formed so as to have an optical film thickness of $\lambda$/4 and a refractive index of 1.46 or below, as shown in FIG. 7, thereby providing a third layer 8.

Five examples of the first embodiment are shown below.

|  |  | Material | Film thickness | Refractive index |
|---|---|---|---|---|
| Example 1 | 1st layer | $SiO_2$ | $1\mu$ | 1.47 |
|  | 2nd layer | $Al_2O_3$ | $\lambda/4$ | 1.60 |
|  | 3rd layer | $SiO_3$ | $\lambda/4$ | 1.46 |
| Example 2 | 1st layer | $SiO_2$ | $2\mu$ | 1.47 |
|  | 2nd layer | $Al_2O_3$ | $\lambda/4$ | 1.60 |
|  | 3rd layer | $SiO_2$ | $\lambda/4$ | 1.46 |
| Example 3 | 1st layer | $SiO_2$ | $3\mu$ | 1.47 |
|  | 2nd layer | $Al_2O_3$ | $\lambda/4$ | 1.60 |
|  | 3rd layer | $SiO_2$ | $\lambda/4$ | 1.46 |
| Example 4 | 1st layer | $SiO_2$ | $4\mu$ | 1.47 |
|  | 2nd layer | $Al_2O_3$ | $\lambda/4$ | 1.60 |
|  | 3rd layer | $SiO_2$ | $\lambda/4$ | 1.46 |
| Example 5 | 1st layer | $SiO_2$ | $5\mu$ | 1.47 |
|  | 2nd layer | $Al_2O_3$ | $\lambda/4$ | 1.60 |
|  | 3rd layer | $SiO_2$ | $\lambda/4$ | 1.46 |

The spectral reflection factor of Examples 1, 2, 3, 4 and 5 above are illustrated in FIGS. 16, 17, 18, 19 and 20, respectively.

By forming the silicon dioxide ($SiO_2$) to a great thickness, the cyclic period of ripples is shortened, as shown in FIGS. 16 to 20, and the refractive index of the silicon dioxide ($SiO_2$) is approximate to that of CR-39, so that reproducibility is improved by the amplitude of the ripples being reduced. Further, since CR-39 and silicon dioxide ($SiO_2$) are excellent in affinity to each other and the latter ($SiO_2$) is of low fusing point, the silicon dioxide ($SiO_2$) can be readily deposited on the CR-39 base 2 by evaporation and can also reinforce the mechanical strength on the surface of the CR-39 base 2.

Figure 18:
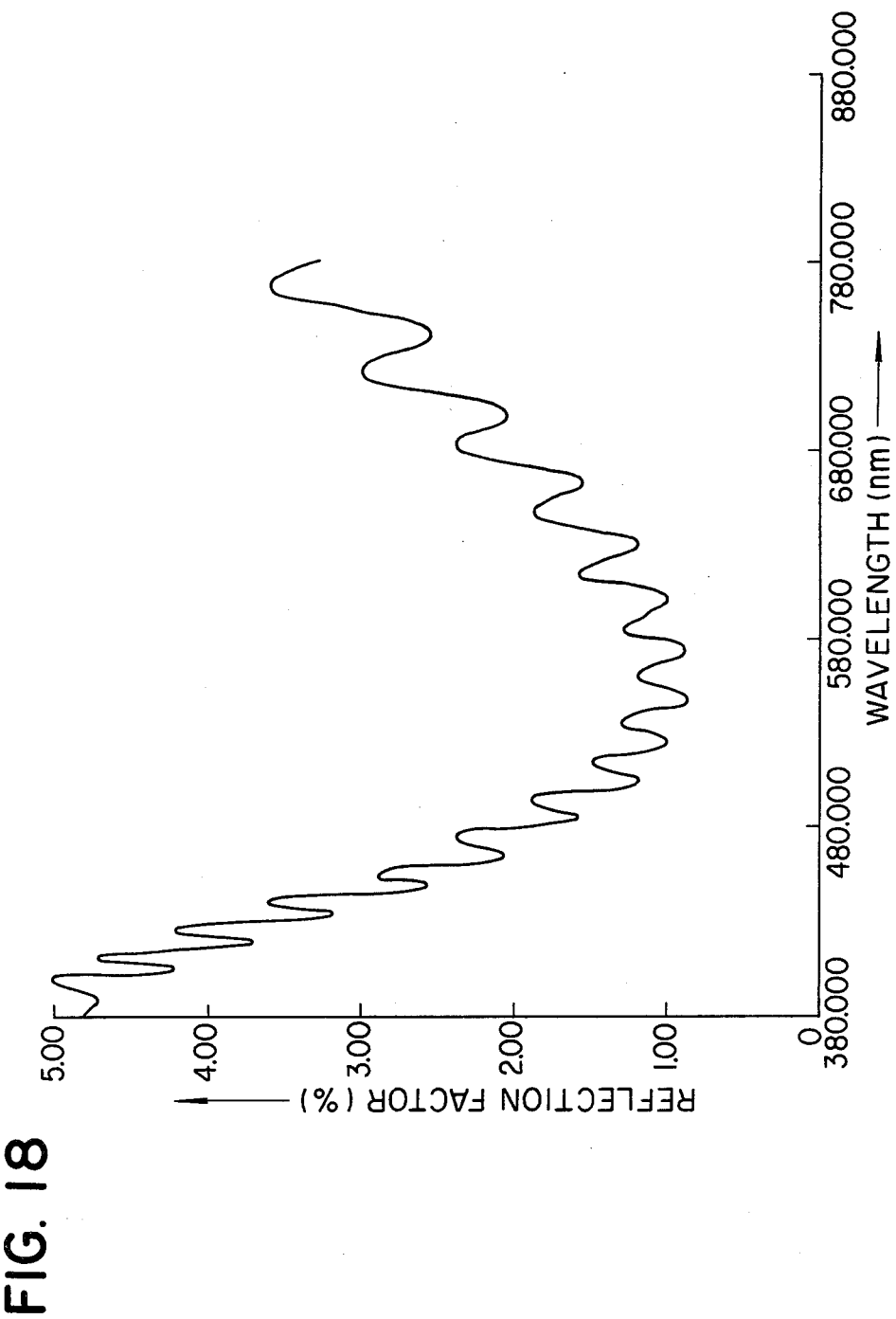
Figure 19:
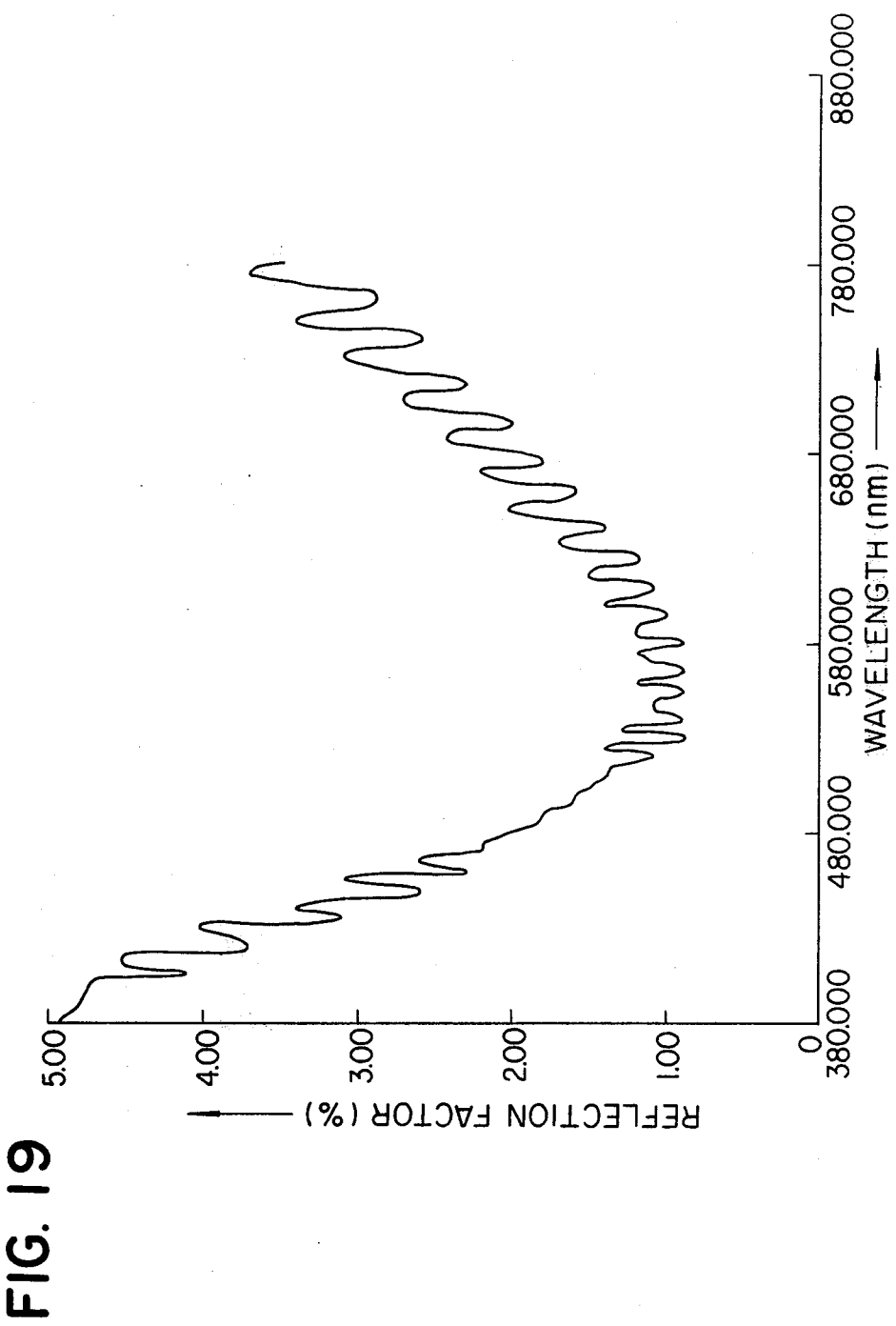
Figure 20:
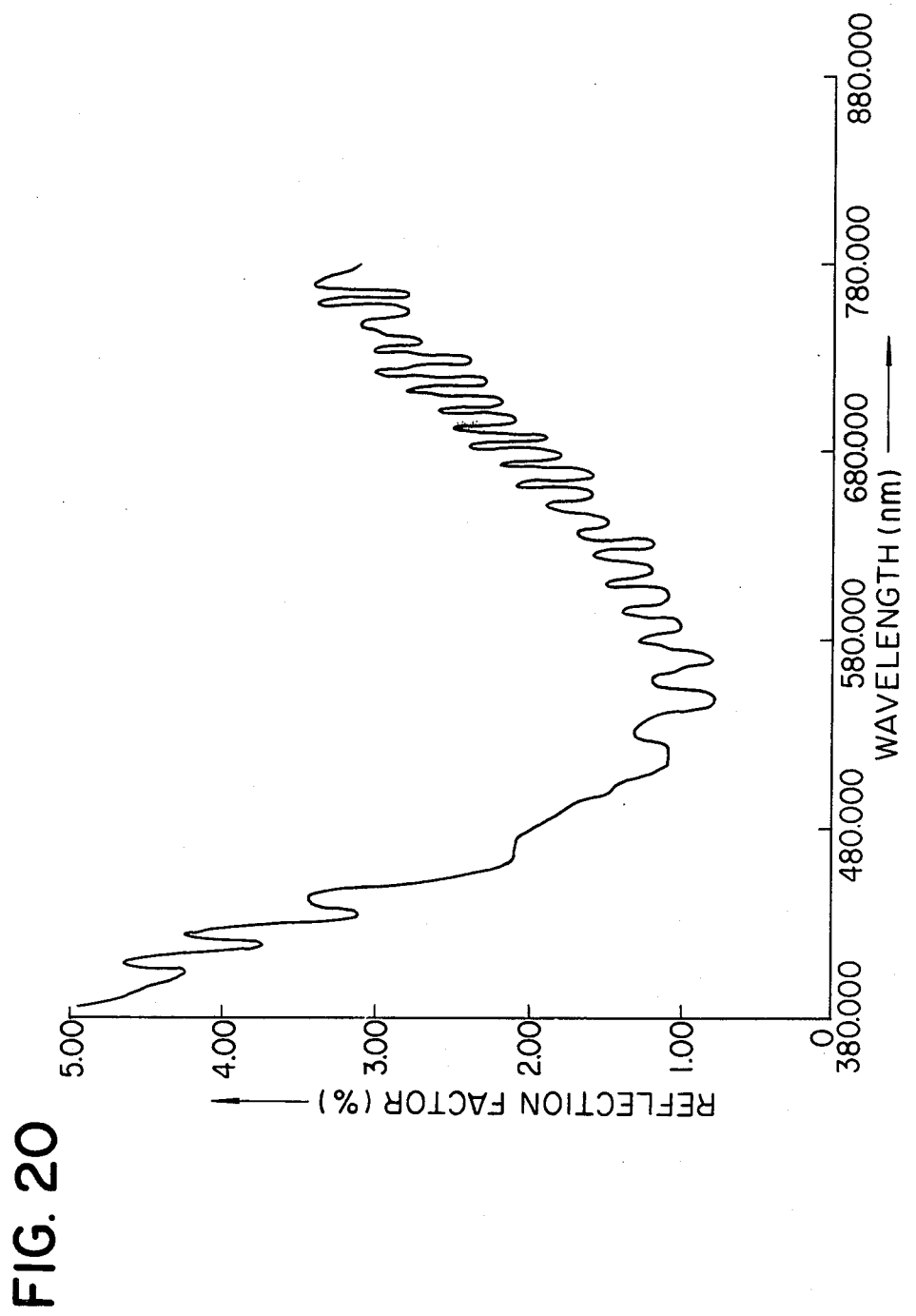

The refractive index of the material heretofore used as the second layer is 1.70 to 2.10 which is higher than the refractive index of alumina ($Al_2O_3$) and therefore, in respect of the spectral reflection factor, the reflection factor of the conventionally used material is remarkably decreased in the center of the visible range and increased at the ends of the visible range, and this results is intensely purplish red reflection color which is not preferable in terms of fashionability. However, in the embodiment using alumina ($Al_2O_3$), the reflection factor assumes a gentle curve as seen in FIG. 18, for example, and as the result, the reflection color becomes magenta which means a favorable fashionability when the invention is used in spectacles or the like. Alumina ($Al_2O_3$) is also high in mechanical strength and this contributes to improved mechanical strength of the entire coat and in addition, the chemical stability of alumina ($Al_2O_3$) contributes to the formation of a film which is improved from the standpoint of aging.

According to the present embodiment, therefore, there is provided anti-reflection film which is high in mechanical strength and better withstands aging, and which produces magenta as the reflection color which in turn enables good reproducibility.

Figure 2:
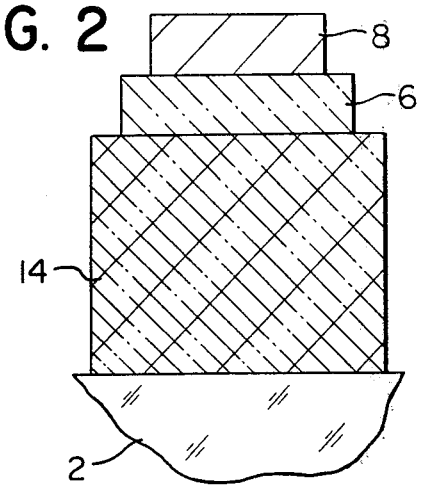
FIG. 2 shows the structure according to a second embodiment of the present invention.

A second embodiment of the present invention will now be described. The structure of this embodiment is shown in FIG. 2, and the relationships between the film thickness and the film forming speed of silicon dioxide ($SiO_2$) and alumina ($Al_2O_3$) are illustrated in FIGS. 10 and 11, respectively.

Under a pressure of $5\times 10^{-5}$ Torr or less, and at a rate of 10 to 50 Å/sec., silicon dioxide ($SiO_2$) and alumina ($Al_2O_3$) are formed into respective films on CR-39 base 2 from two evaporation sources.

Figure 10:
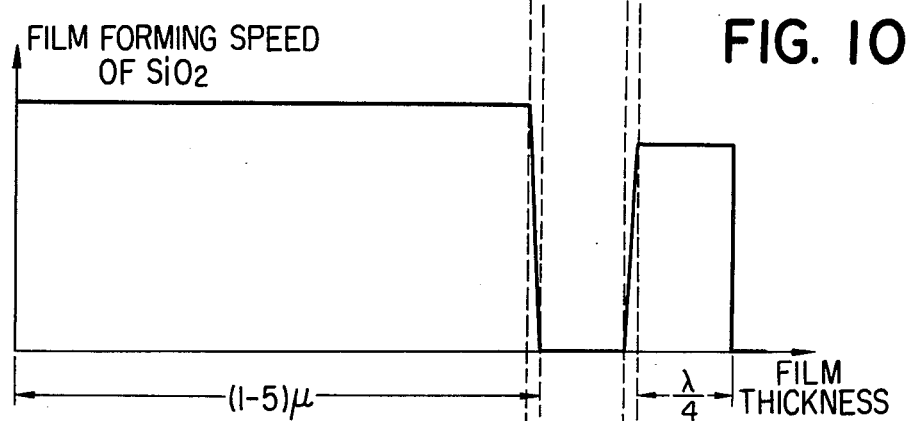
FIGS. 10 and 11 illustrate the relationship between the film thickness and the film forming speed of the film material in the second embodiment.
Figure 11:
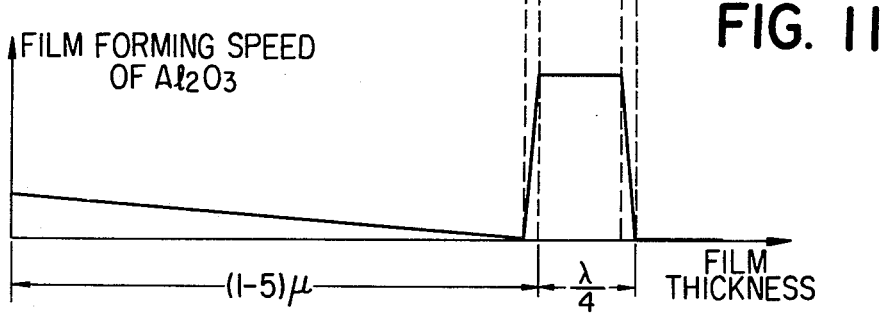
Figure 16:
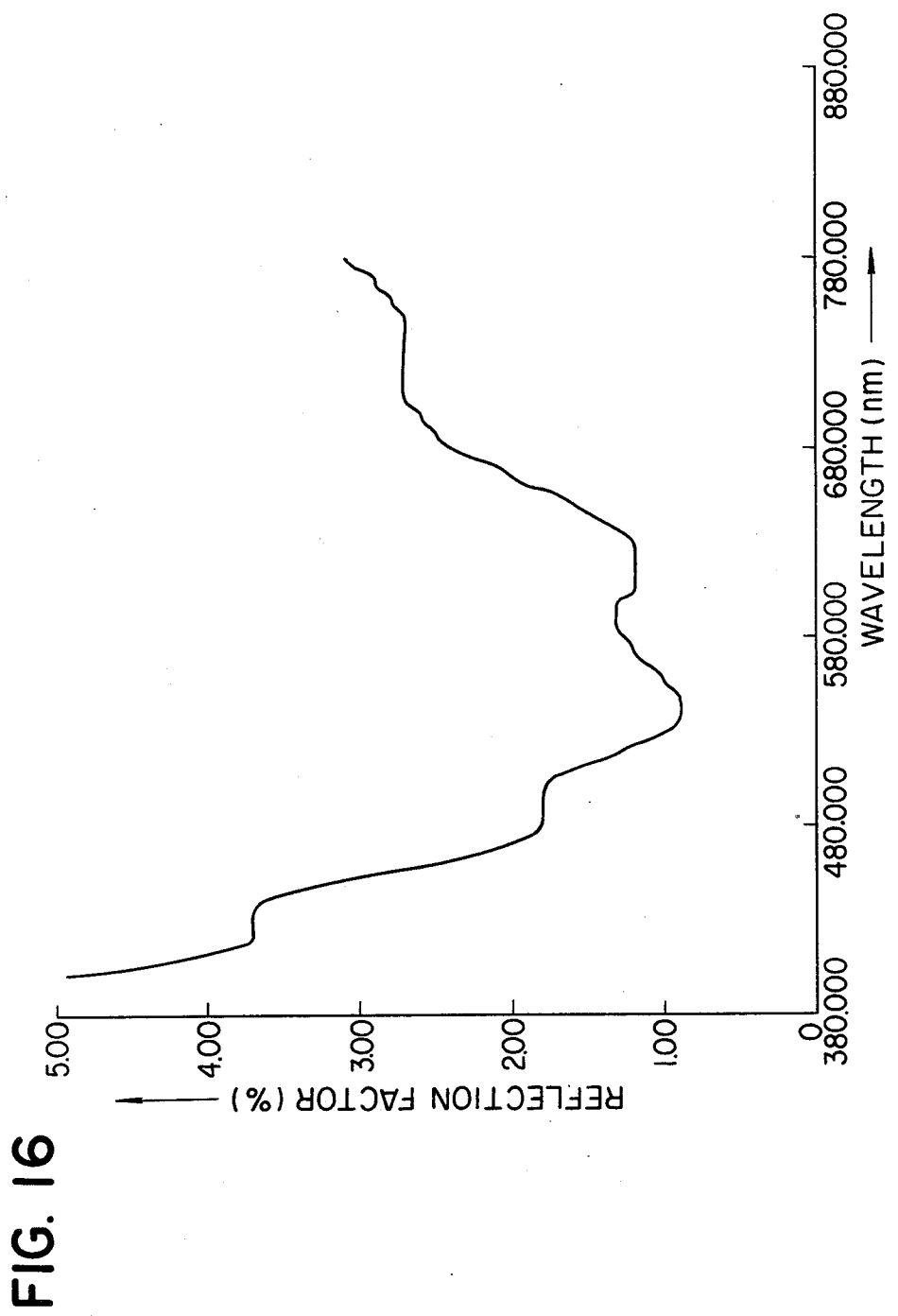
FIGS. 16 to 20 illustrate the spectral reflection factor in various examples of the first embodiment.
Figure 17:
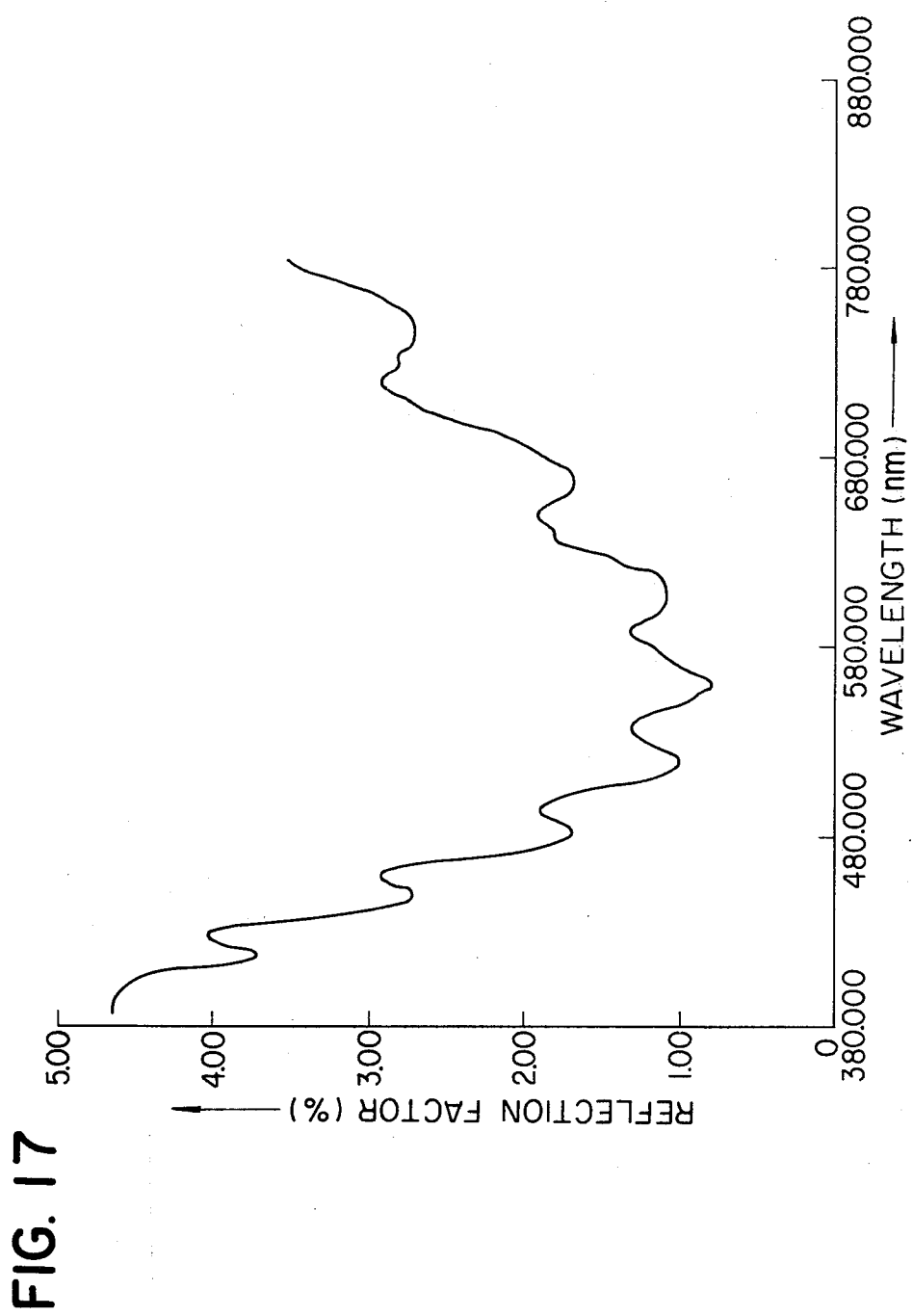
Figure 21:
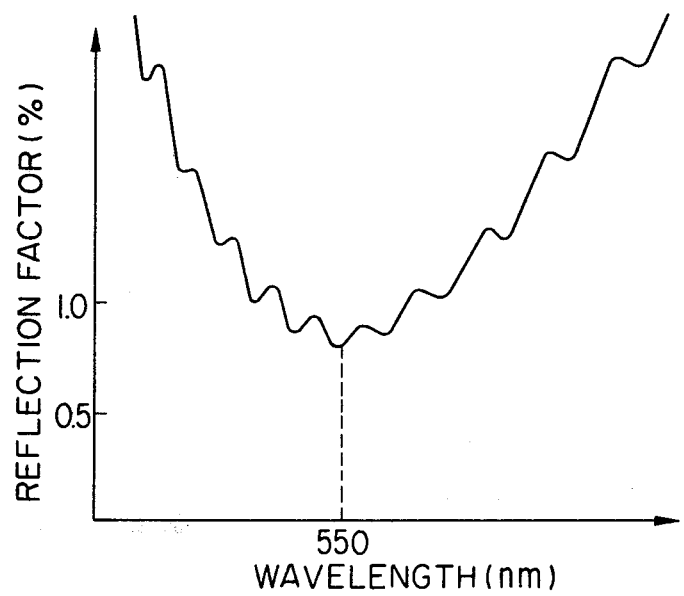
FIG. 21 illustrates the spectral reflection factor of the second embodiment.

First, silicon dioxide ($SiO_2$) is formed into a film at a predetermined speed as shown in FIG. 10 and the film forming speed of $Al_2O_3$ is gradually slowed down as shown in FIG. 11, thereby forming a first layer 14 which is a film of the mixture of the two materials. The film is formed from the two evaporation sources such that the refractive index of the first layer 14 is 1.47 to 1.49 in the portion thereof adjacent to the base 2, and continuously decreased therefrom in the direction of film thickness to provide a refractive index of 1.45 to 1.47 from the geometrical film thickness of 1–5$\mu$. Thus, the refractive index of the first layer 14 in the portion thereof adjacent to the base 2 is very close to the refractive index 1.50 of the base and hence, as is seen in FIG. 21 (which illustrates the spectral reflection factor where the film thickness of the first layer 14 is 3$\mu$ in the present embodiment), the spectral reflection of the present embodiment excels that of the first embodiment (shown in FIG. 18, for example) in that the amplitude of ripples is smaller to improve the reproducibility.

Subsequently, the film forming speed of silicon dioxide ($SiO_2$) is abruptly reduced while, at the same time, the film forming speed of alumina ($Al_2O_3$) is abruptly increased, whereby the film forming speeds of silicon dioxide ($SiO_2$) and alumina ($Al_2O_3$) are rendered constant and under such condition, a second layer 6 is formed such that it has a refractive index of 1.51 to 1.63 and an optical film thickness of $\lambda/4$. Subsequently, in contrast with the above, the film forming speed of alumina ($Al_2O_3$) is abruptly reduced as shown in FIG. 10 while, the film forming speed of silicon dioxide ($SiO_2$) is increased, a third layer 8 is formed such that it has a refractive index of 1.46 or below at a rate of 10 to 50 Å/sec. and an optical film thickness of $\lambda/4$. The use of such method of forming film from two evaporation sources further enhances the adherence property of the film because the definite boundary as noted in the first embodiment is absent between the first layer of silicon dioxide ($SiO_2$) and the second layer of alumina ($Al_2O_3$) and a new film is always formed on the base 2 from the start of film formation.

The film thicknesses in the respective boundary areas range from 10 to 100 Å and the influence thereof upon the spectral reflection factor in those boundary areas is negligible.

Thus, according to the second embodiment of the invention, there is provided anti-reflection film for a synthetic resin base which is better in its adherence property the reproducibility of the film, in addition to the improved effect attained in the first embodiment.

The first layer 14 need not be formed by using two evaporation sources to mix alumina ($Al_2O_3$) and silicon dioxide ($SiO_2$), but a layer of each material may be formed alternately to attain the same optical effect as described above.

To provide an effect equivalent to that of the second embodiment, several particular portions of the first layer divided by a multiple of the optical film thickness $\lambda/4$ may be substituted for by three layers of silicon dioxide ($SiO_2$), alumina ($Al_2O_3$) and silicon dioxide ($SiO_2$), by the use of the theory of equivalent film.

Figure 3:
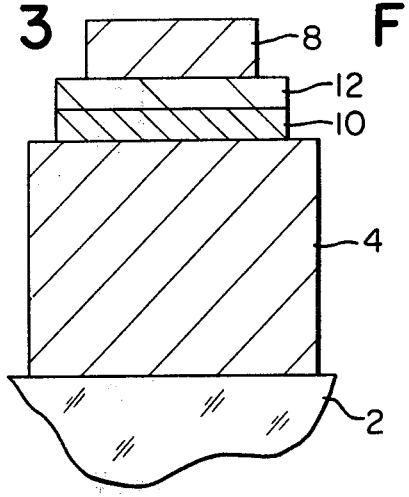
FIG. 3 shows the structure according to a third embodiment of the present invention.

The third embodiment of the present invention will now be described. The structure of this embodiment is shown in FIG. 3, the relationship between the film forming speed and the film thickness of silicon dioxide ($SiO_2$) is illustrated in FIG. 13, the relationship between the film forming speed and the film thickness of either silicon monoxide (SiO) or zirconium oxide (ZrO₂) is illustrated in FIG. 14, and the relationship between the film forming speed and the film thickness of either zirconium oxide (ZrO₂) or titanium trioxide (Ti₂O₃) is illustrated in FIG. 15.

In the present embodiment, silicon dioxide (SiO₂) is formed into a film of thickness 1–5μ on a base 2 to thereby provide a first layer 4, as in the first embodiment, whereafter a second layer divided into two sub-layers is formed, namely, by forming either silicon monoxide (SiO) or zirconium oxide (ZrO₂) into an optical film thickness of λ/4 as the lower portion 10 of the second layer and forming thereon zirconium oxide (ZrO₂) or titanium trioxide (Ti₂O₃) as the upper portion 12 of the second layer, and then silicon dioxide (SiO₂) is further formed into a film thickness of λ/4 on the second layer to provide a third layer 8.

More particularly, the refractive index $n_1$ of the first layer 4 ranges from 1.45 to 1.48, the refractive index $n_2$ of the lower portion 10 of the second layer ranges from 1.70 to 2.10, and the refractive index $n_3$ of the upper portion 12 of the second layer ranges from 1.80 to 2.50. Between these refractive indices $n_1$ and $n_2$ and $n_3$, there is established a relation (A) that $n_1 < n_2 < n_3$. There is a further relation (B) of $n_2:n_3$, which is as follows:

$$\left(\frac{n_2}{n_3}\right) = \frac{\sqrt{n_1}}{n_4} \sqrt{\frac{1 - \sqrt{R_o}}{1 + \sqrt{R_o}}} \quad (B),$$

where $n_4$ represents the refractive index of the third layer 8 and $R_o$ the reflection factor of this optical member for a desired wavelength λ.

The present embodiment must satisfy these two conditions (A) and (B).

Five examples of the third embodiment are shown below.

|  |  | Material | Film thickness | Refractive index |
|---|---|---|---|---|
| Example 6 | 1st layer | SiO₂ | 1 μ | 1.47 |
|  | 2nd layer | ZrO₂ | λ/4 | 1.95 |
|  | 3rd layer | ZrO₂ | λ/4 | 2.15 |
|  | 4th layer | SiO₂ | λ/4 | 1.46 |
| Example 7 | 1st layer | SiO₂ | 2 μ | 1.47 |
|  | 2nd layer | ZrO₂ | λ/4 | 1.95 |
|  | 3rd layer | ZrO₂ | λ/4 | 2.15 |
|  | 4th layer | SiO₂ | λ/4 | 1.46 |
| Example 8 | 1st layer | SiO₂ | 3 μ | 1.47 |
|  | 2nd layer | ZrO₂ | λ/4 | 1.95 |
|  | 3rd layer | ZrO₂ | λ/4 | 2.15 |
|  | 4th layer | SiO₂ | λ/4 | 1.46 |
| Example 9 | 1st layer | SiO₂ | 4 μ | 1.47 |
|  | 2nd layer | ZrO₂ | λ/4 | 1.95 |
|  | 3rd layer | ZrO₂ | λ/4 | 2.15 |
|  | 4th layer | SiO₂ | λ/4 | 1.46 |
| Example 10 | 1st layer | SiO₂ | 5 μ | 1.47 |
|  | 2nd layer | ZrO₂ | λ/4 | 1.95 |
|  | 3rd layer | ZrO₂ | λ/4 | 2.15 |
|  | 4th layer | SiO₂ | λ/4 | 1.46 |

Spectral reflection factor in Examples 6, 7, 8, 9 and 10 above are illustrated in FIGS. 22, 23, 24, 25 and 26, respectively. As seen from the spectral reflection factor, the reflection color is pale green which means that the range in which the anti-reflection effect is achieved is wider than in the first and second embodiments.

The same effect as described above may also be attained by forming titanium trioxide (Ti₂O₃) to an optical film thicknes of λ/4 on the lower portion 10 of the second layer and forming titanium dioxide (TiO₂) or cerium dioxide (CeO₂) to an optical thickness of λ/4 on the upper portion 12 of the second layer.

Thus, with the structure of the present embodiment, in addition to the effect attained by the first embodiment, the range in which the anti-reflection effect is achieved within the visible range is widened and the reflection color presents green which is more favorable in fashionability when the invention is used in spectacles or the like.

Figure 4:
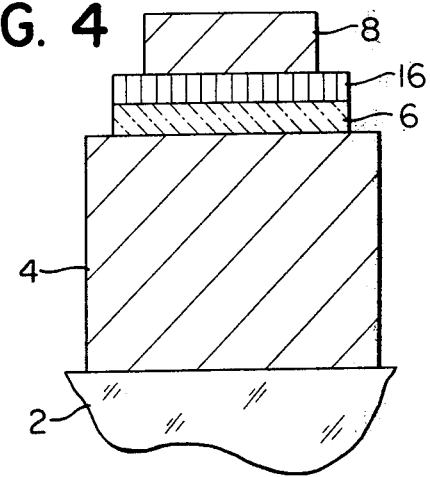
FIG. 4 shows the structure according to a fourth embodiment of the present invention.

Description will now be made of a fourth embodiment with reference to FIG. 4. As in the third embodiment, silicon dioxide (SiO₂) is formed into a film of 1–5μ on CR-39 base 2 to provide a first layer 4 of great thickness, and subsequently alumina (Al₂O₃) is formed to an optical film thickness of λ/4 as the lower portion 6 of a second layer, whereafter either zirconium oxide (ZrO₂) or titanium dioxide (TiO₂) is formed to an optical film thickness of λ/4 as the upper portion 16 of the second layer, and then silicon dioxide (SiO₂) is formed to an optical film thickness of λ/4 as a third layer 8. Again in this embodiment, the condition (A) for the third embodiment must be satisfied.

Figure 27:
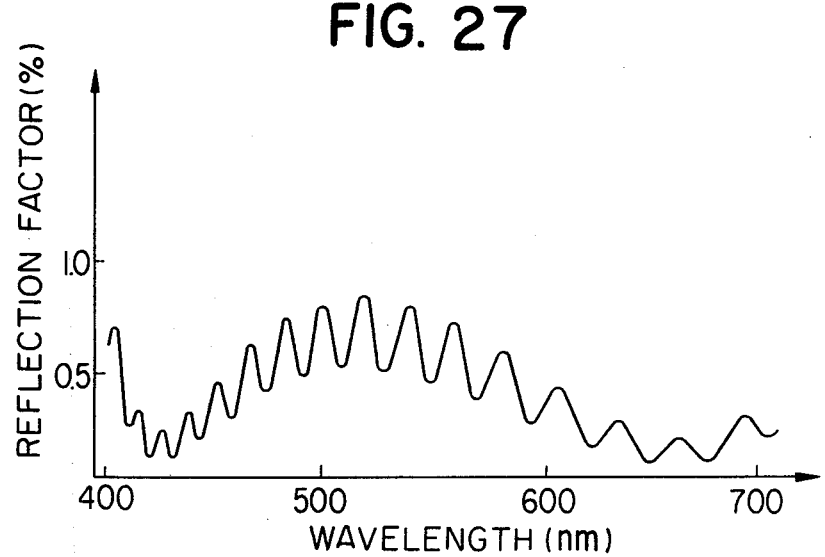
FIG. 27 illustrates the spectral reflection factor of the fourth embodiment.
Figure 22:
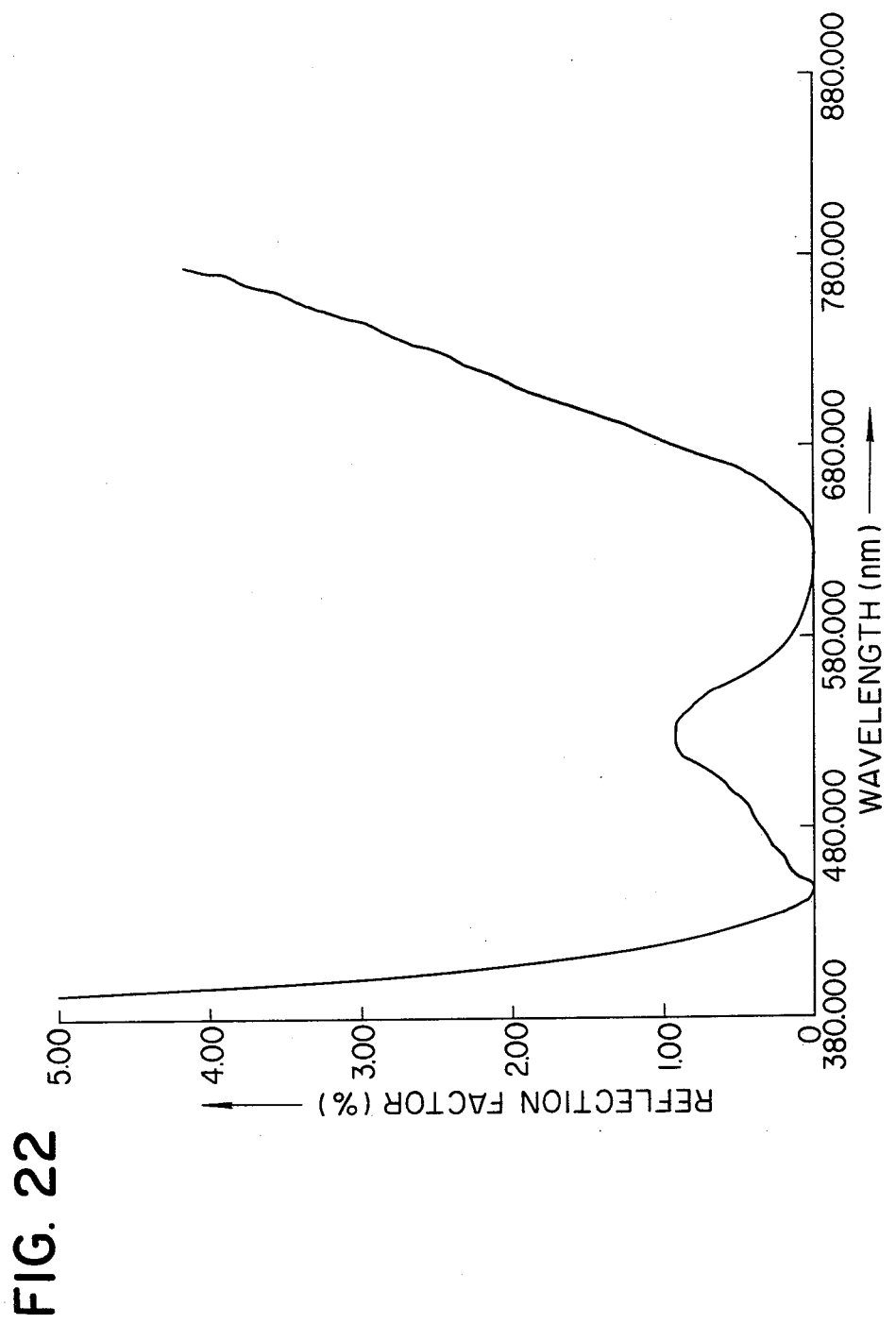
FIGS. 22 to 26 illustrate the spectral reflection factor in various examples of the third embodiment.
Figure 23:
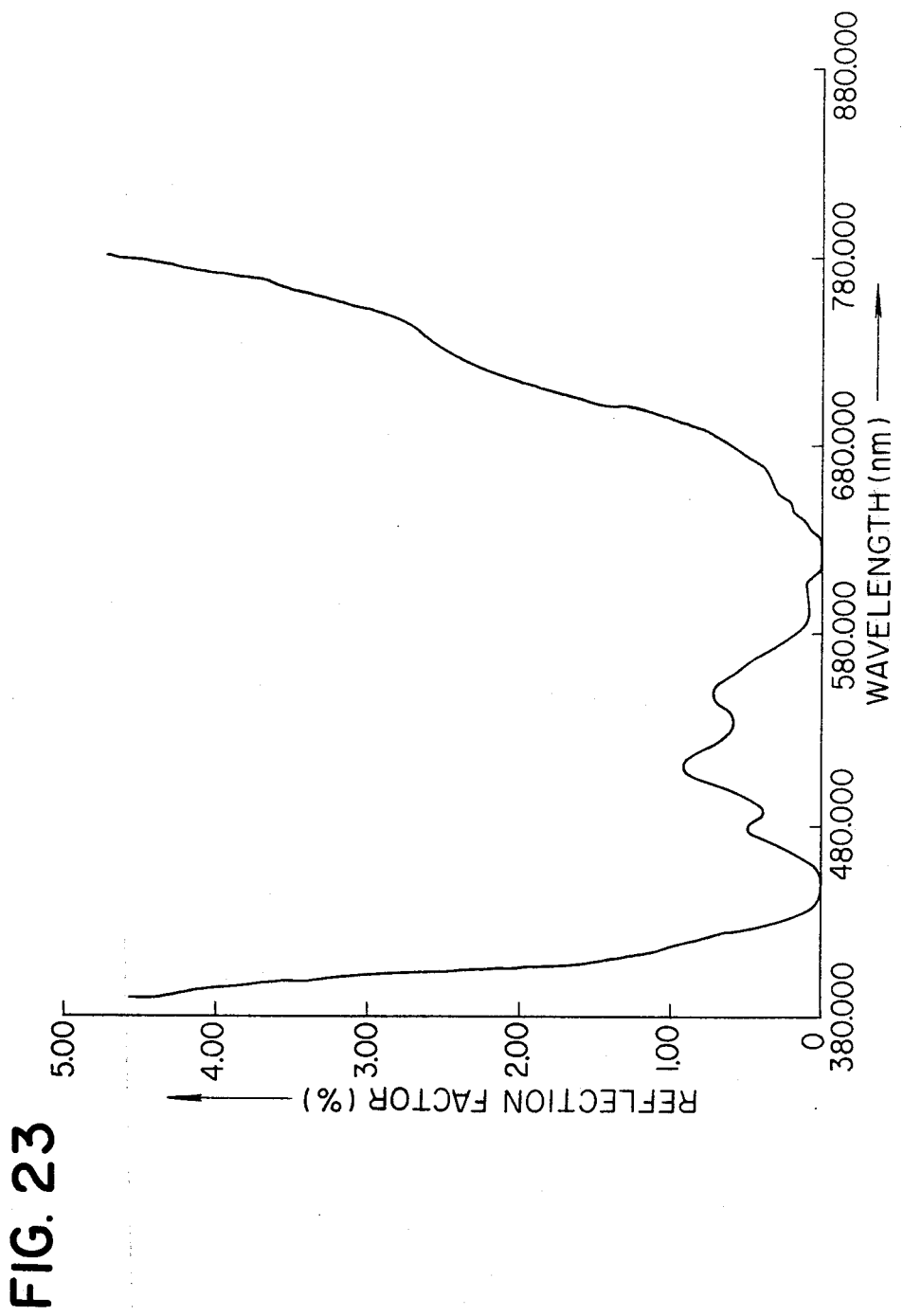
Figure 24:
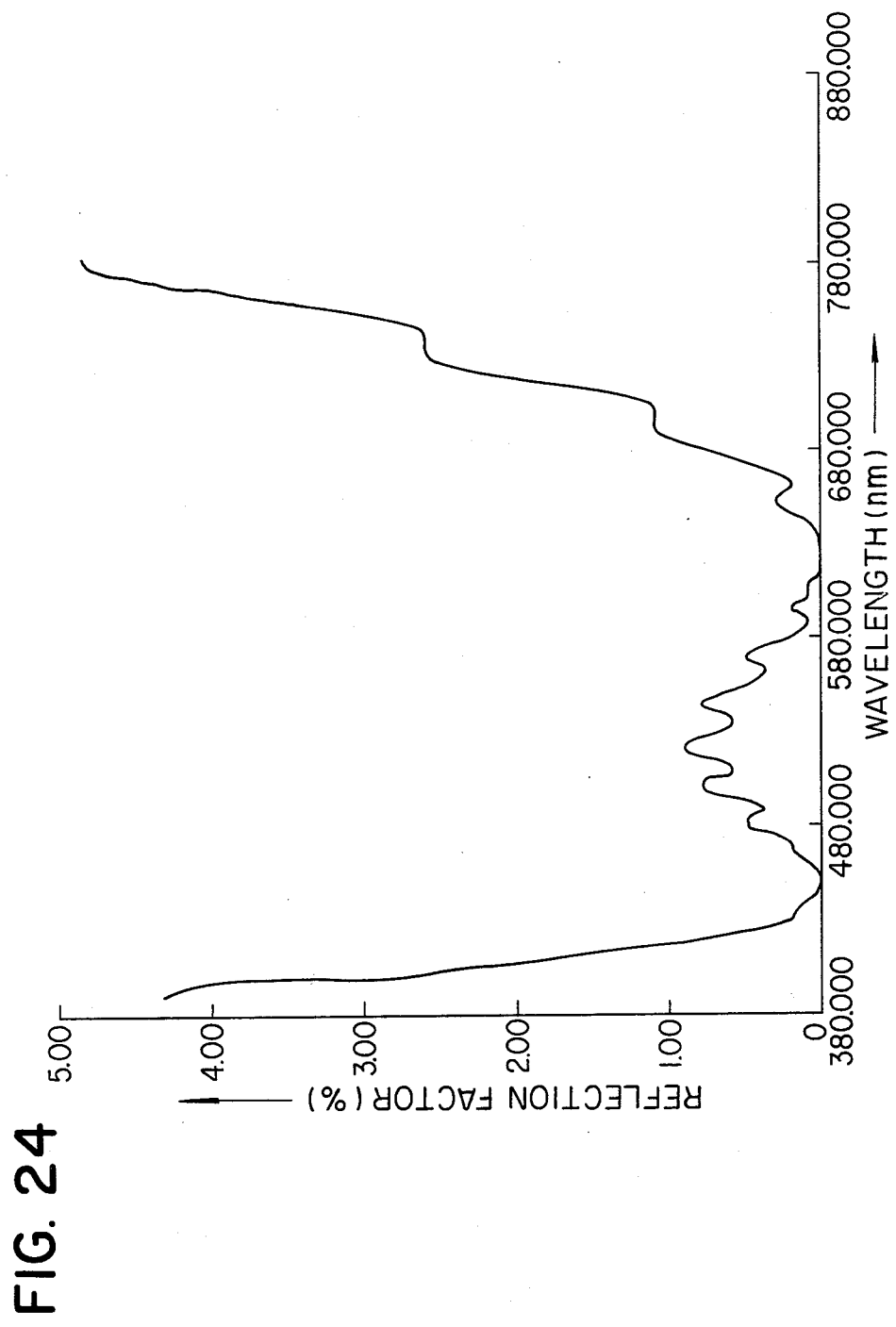
Figure 25:
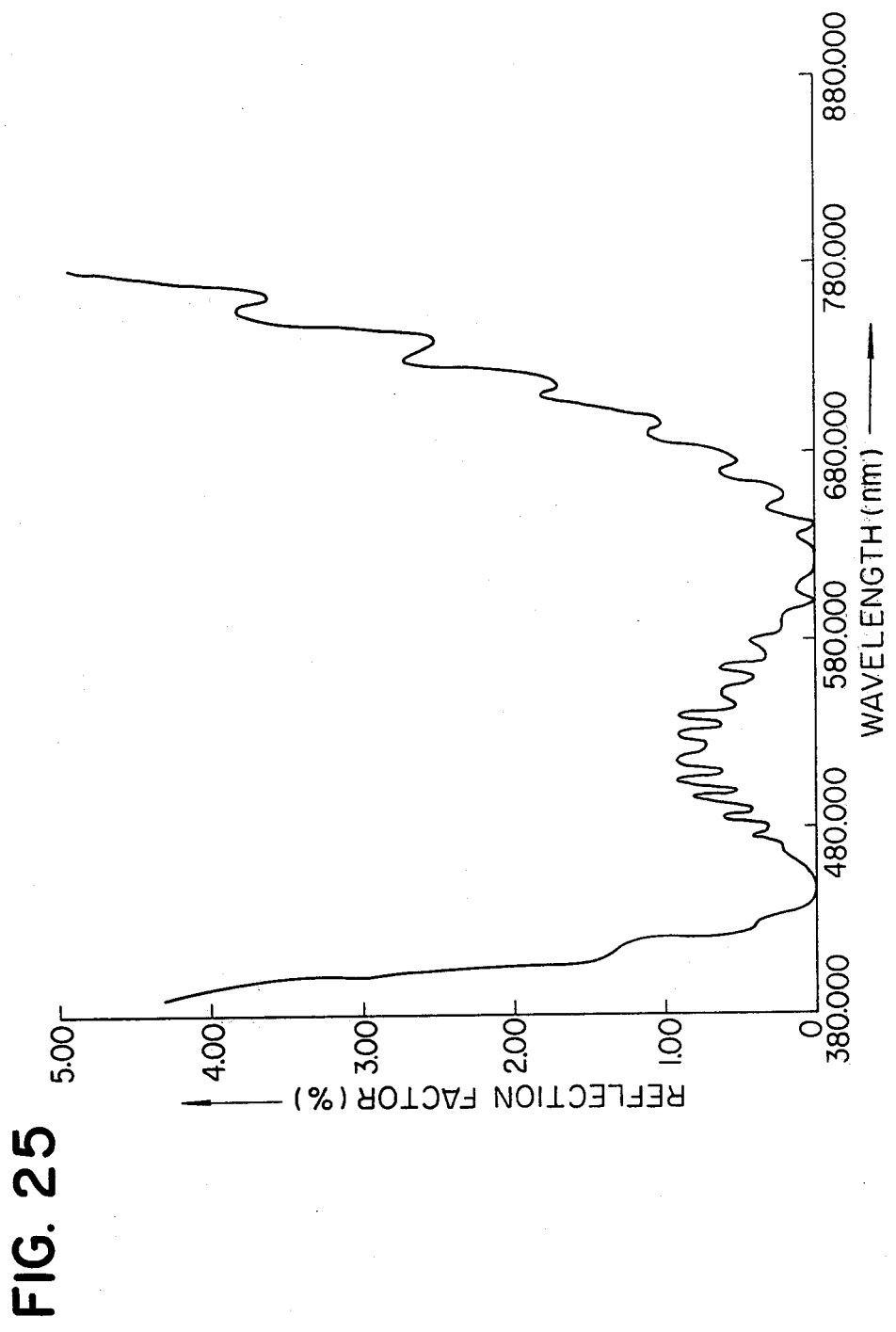
Figure 26:
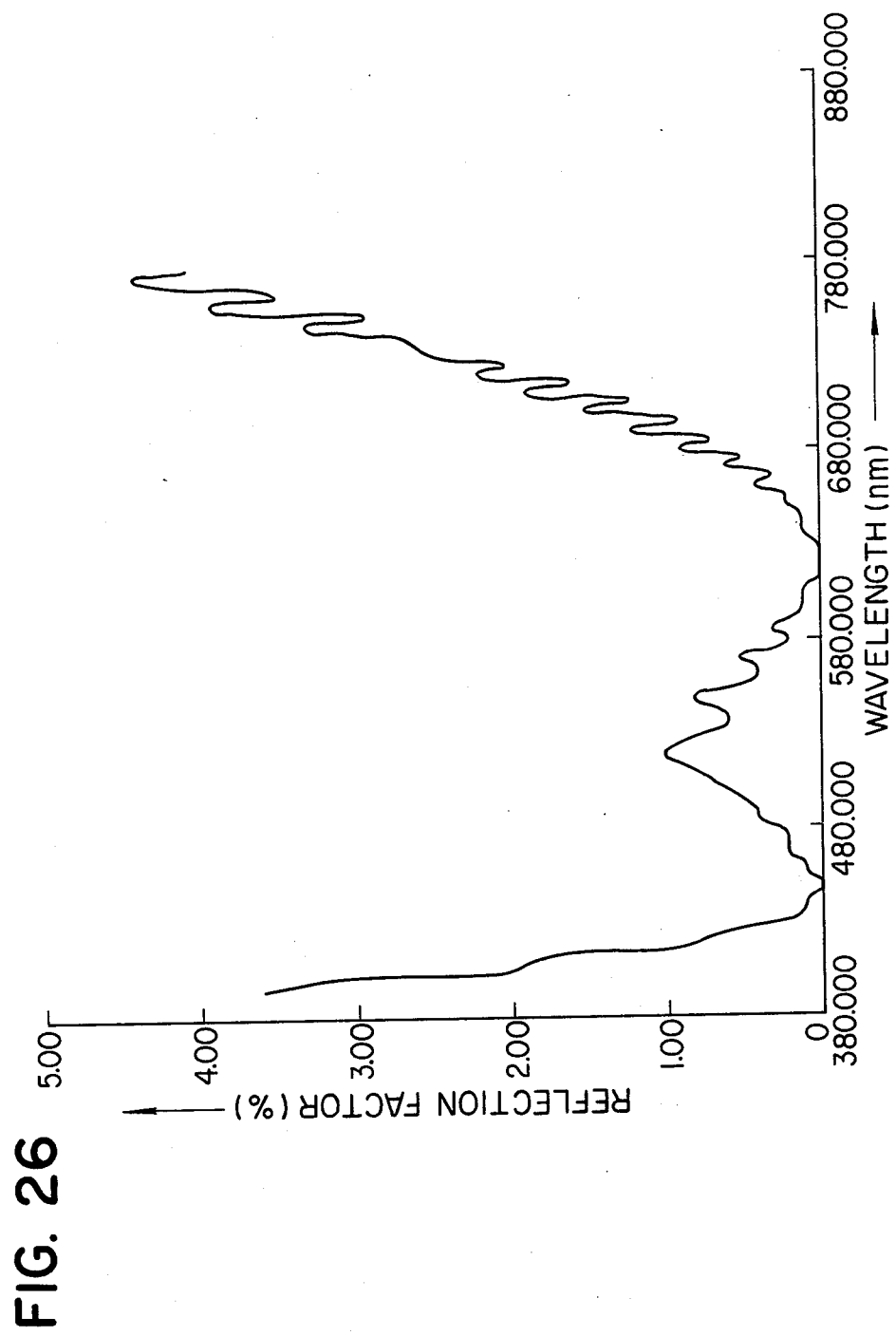
Figure 28:
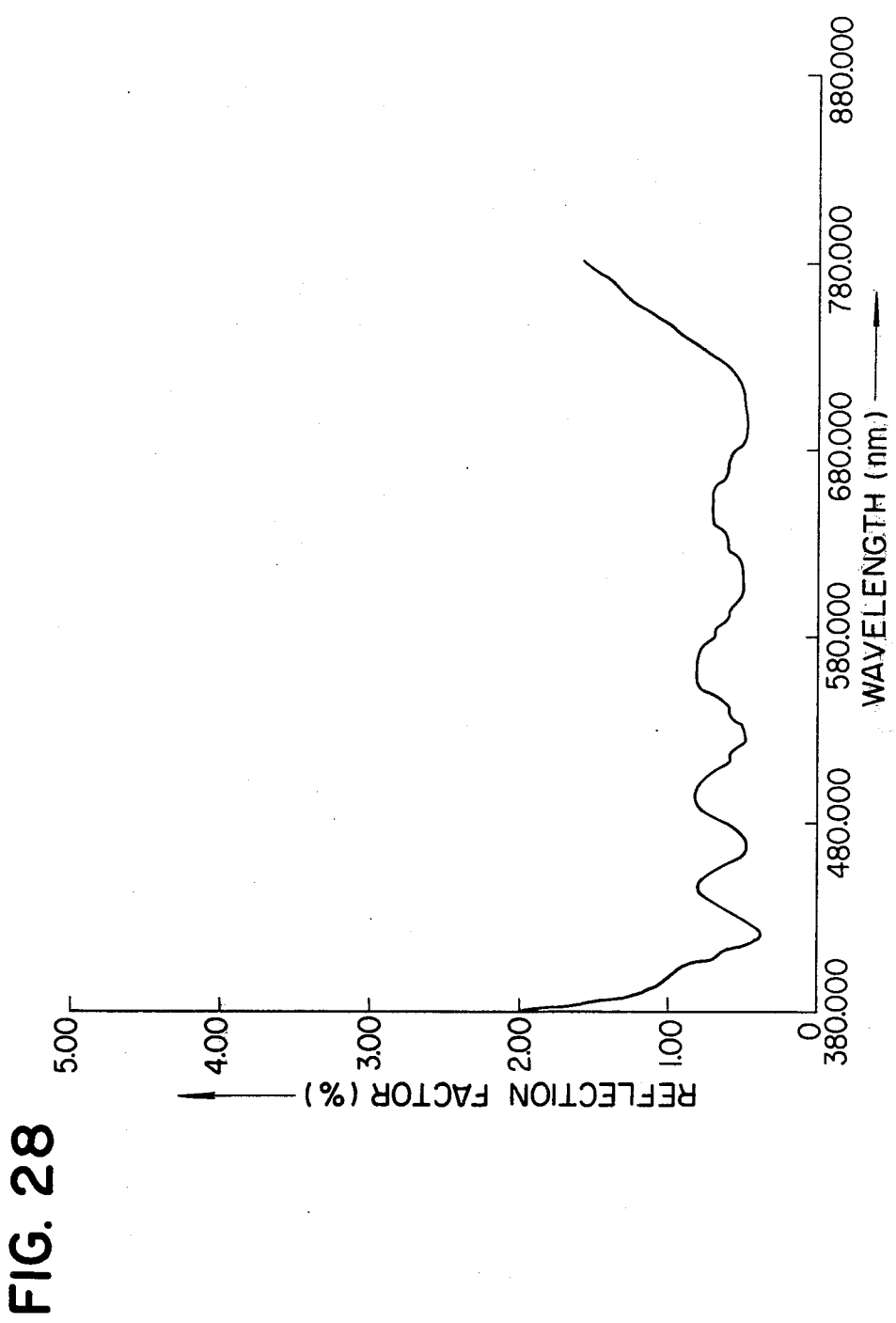
FIGS. 28 to 32 illustrate the spectral reflection factor in various examples of the fifth embodiment.
Figure 29:
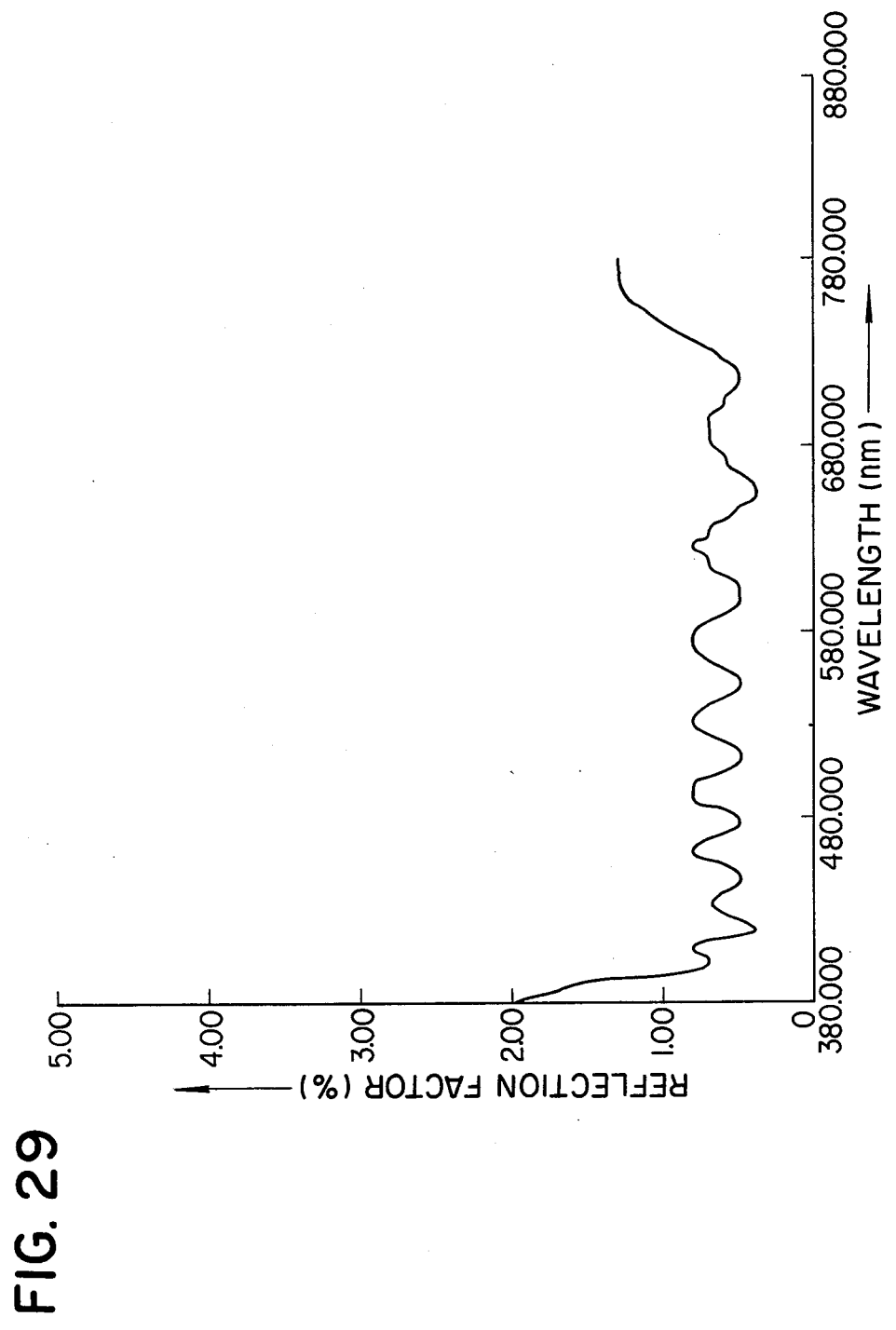
Figure 30:
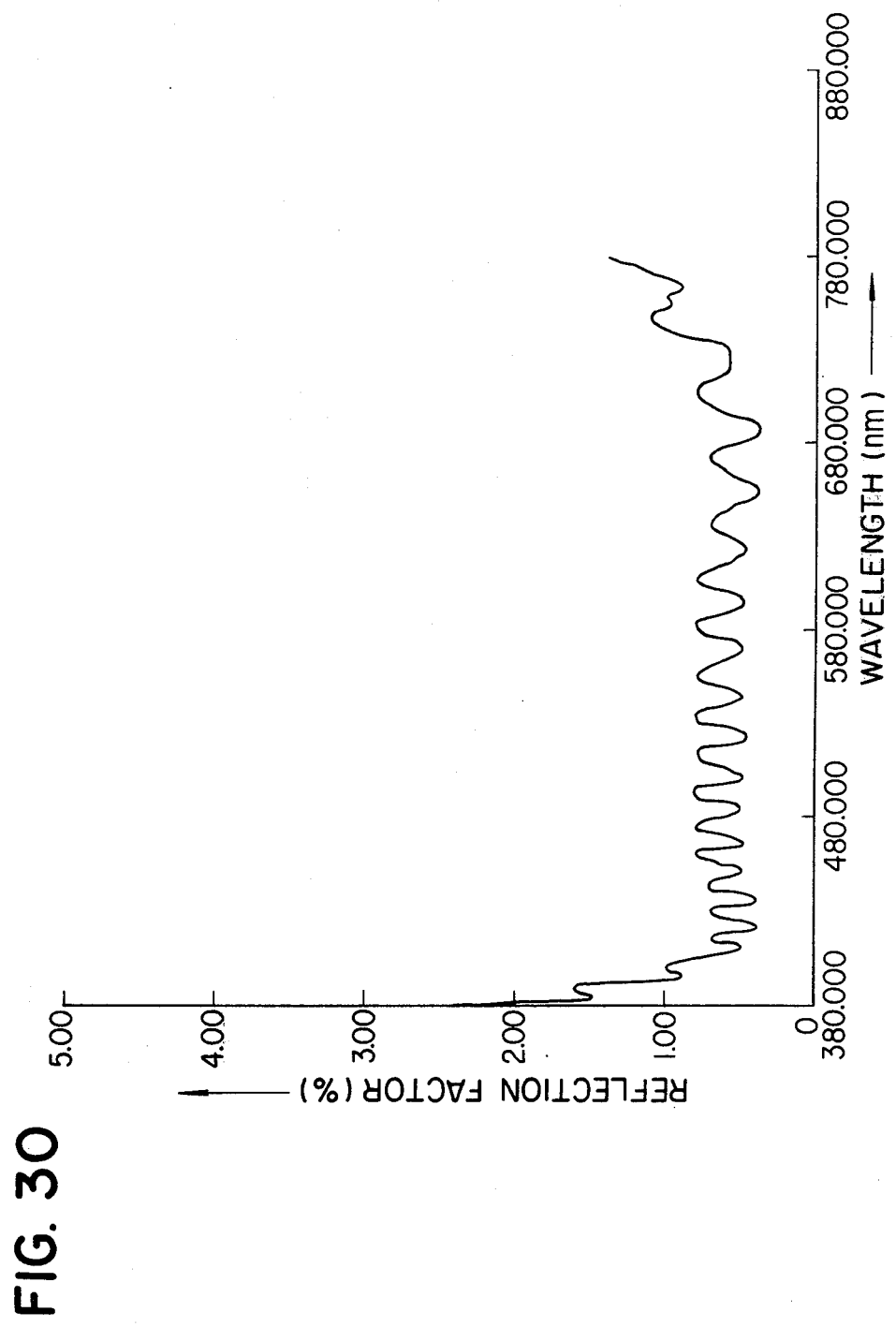
Figure 31:
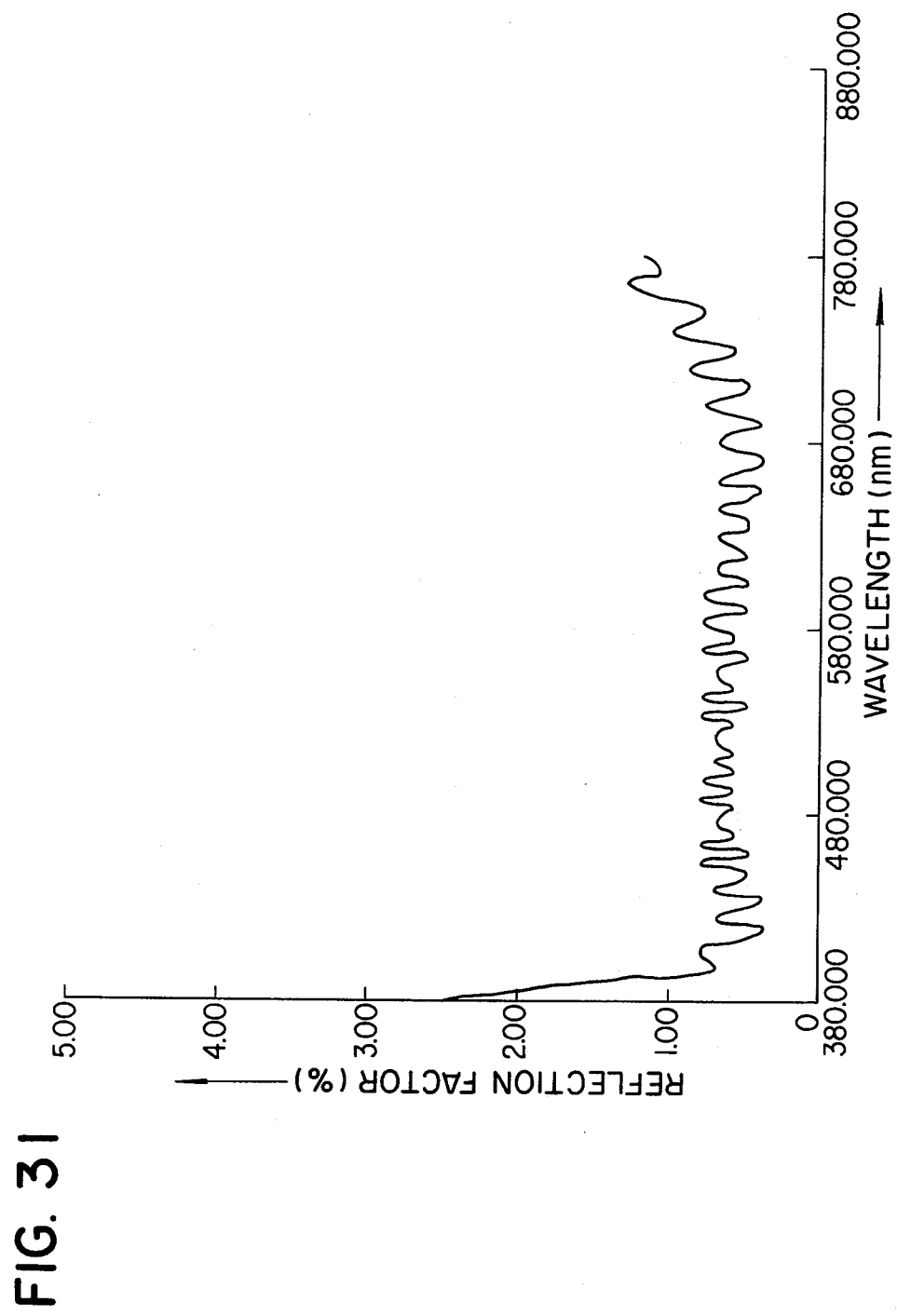
Figure 32:
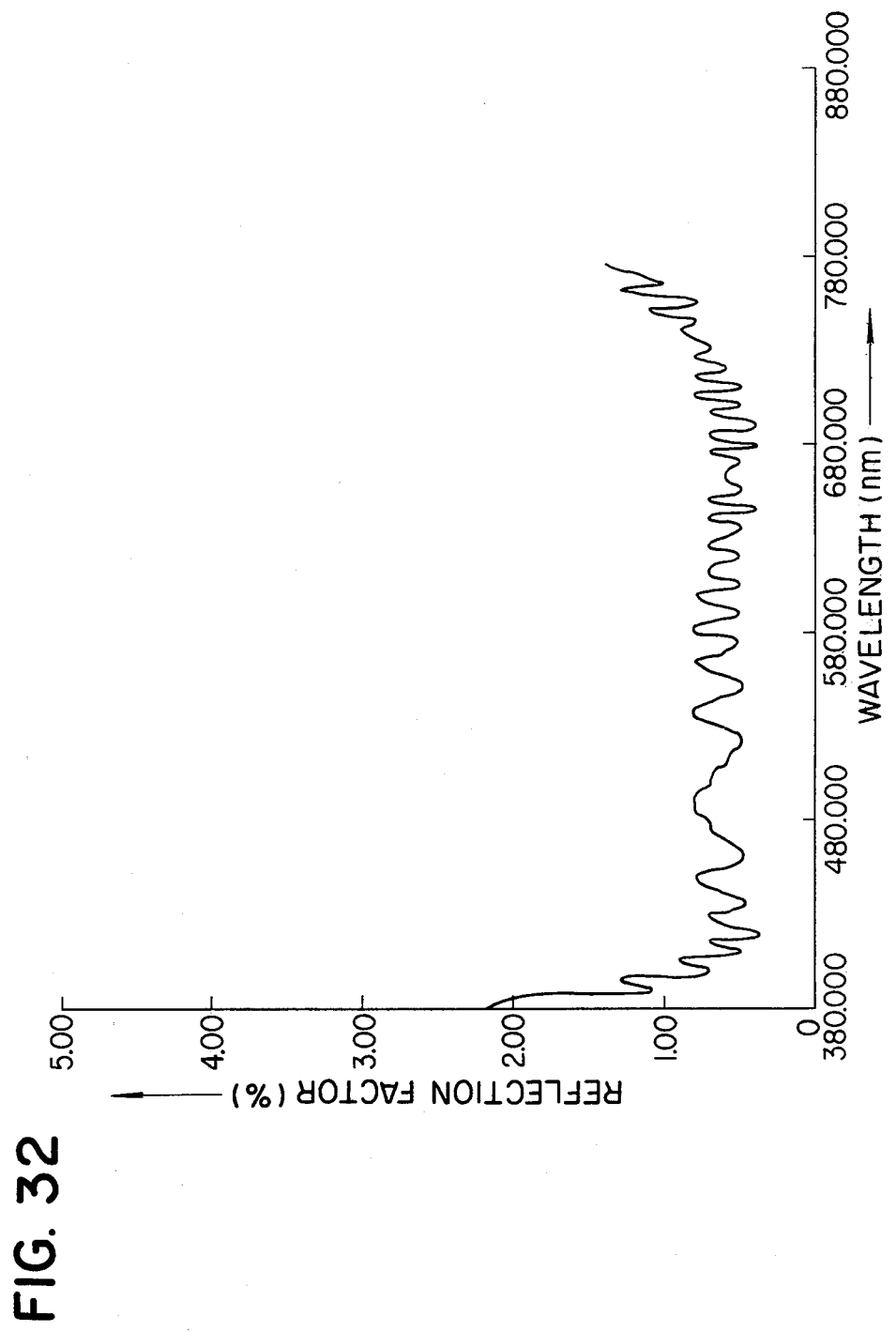

FIG. 27 shows the spectral reflection factor provided where the film thickness of the first layer 4 in the present embodiment is 3μ. As a result, as in the third embodiment and again in this embodiment, the range in which the anti-reflection effect is achieved within the visible range is widened and the reflection color presents green which is more favorable in fashionability when the film of the invention is used in spectacles or the like.

Figure 5:
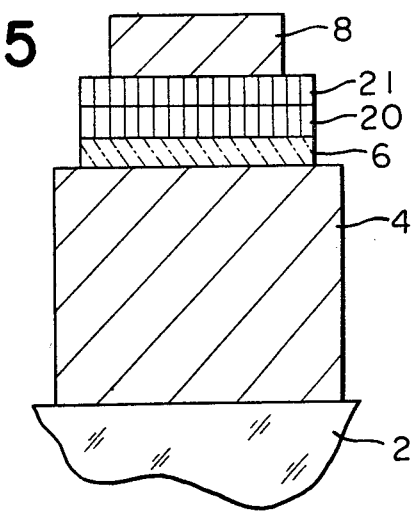
FIG. 5 shows the structure according to a fifth embodiment of the present invention.

A fifth embodiment of the present invention will be described with reference to FIG. 5. In this embodiment, the third layer 16 of ZrO₂ or TiO₂ having a film thickness λ/4 in the fourth embodiment of FIG. 4 is divided into two layers of ZrO₂ or TiO₂ each having a film thickness of λ/4, namely, a third layer 20 and a fourth layer 21. In the other points, this embodiment is similar in structure to the fourth embodiment.

Five examples of the fifth embodiment are shown below.

|  |  | Material | Film thickness | Refractive index |
|---|---|---|---|---|
| Example 11 | 1st layer | SiO₂ | 1 μ | 1.47 |
|  | 2nd layer | Al₂O₃ | λ/4 | 1.60 |
|  | 3rd layer | ZrO₂ | λ/4 | 1.94 |
|  | 4th layer | ZrO₂ | λ/4 | 1.98 |
|  | 5th layer | SiO₂ | λ/4 | 1.46 |
| Example 12 | 1st layer | SiO₂ | 2 μ | 1.47 |
|  | 2nd layer | Al₂O₃ | λ/4 | 1.60 |
|  | 3rd layer | ZrO₂ | λ/4 | 1.94 |
|  | 4th layer | ZrO₂ | λ/4 | 1.98 |
|  | 5th layer | SiO₂ | λ/4 | 1.46 |
| Example 13 | 1st layer | SiO₂ | 3 μ | 1.47 |
|  | 2nd layer | Al₂O₃ | λ/4 | 1.60 |
|  | 3rd layer | ZrO₂ | λ/4 | 1.94 |
|  | 4th layer | ZrO₂ | λ/4 | 1.98 |
|  | 5th layer | SiO₂ | λ/4 | 1.46 |
| Example | 1st layer | SiO₂ | 4 μ | 1.47 |
|  | 2nd layer | Al₂O₃ | λ/4 | 1.60 |

-continued

|  |  | Material | Film thickness | Refractive index |
|---|---|---|---|---|
| 14 | 3rd layer | ZrO$_2$ | λ/4 | 1.94 |
|  | 4th layer | ZrO$_2$ | λ/4 | 1.98 |
|  | 5th layer | SiO$_2$ | λ/4 | 1.46 |
|  | 1st layer | SiO$_2$ | 5 μ | 1.47 |
|  | 2nd layer | Al$_2$O$_3$ | λ/4 | 1.60 |
| Example 15 | 3rd layer | ZrO$_2$ | λ/4 | 1.94 |
|  | 4th layer | ZrO$_2$ | λ/4 | 1.98 |
|  | 5th layer | SiO$_2$ | λ/4 | 1.46 |

The spectral reflection factor in Examples 11, 12, 13, 14 and 15 above are illustrated in FIGS. 28, 29, 30, 31 and 32. As will be seen there, this embodiment is better in spectral reflection factor than the fourth embodiment.

According to the present invention, as will be appreciated from the graphs of spectral reflection factor in the various embodiments, the use of a thick film having a film thickness 1–5μ as the first layer leads to the provision of anti-reflection film for a synthetic resin base having a film thickness within said range of 1–5μ which is excellent in spectral reflection factor and mechanical strength and adherence the property of the film and which possesses improved aging character.

The adherence property of the entire anti-reflection film may be further improved by restricting the film thickness of the first layer to the range of 1 to 3μ, especially, 1 to 1.5μ.

In the third and the fourth embodiments, the first layer is shown as only comprising silicon dioxide (SiO$_2$), whereas the same effect may be attained even if the first layer is formed of a mixture of silicon dioxide (SiO$_2$) and alumina (Al$_2$O$_3$) as in the second embodiment.

Also, if a slight amount of metal such as copper (Cu), aluminum (Al), silver (Ag), gold (Au), chromium (Cr), titanium monoxide (TiO) or indium trioxide (In$_2$O$_3$) is mixed with the film of silicon dioxide (SiO$_2$) or the mixture film of silicon dioxide (SiO$_2$) and alumina (Al$_2$O$_3$), the resultant optical member will have a color peculiar to that metal which is attributable to the light absorbing characteristic of the metal, and it will thus become possible to make an optical member having any desired color and moreover, to provide anti-reflection film which is excellent in durability due to the addition of the metal.

In any of the shown embodiments, the third layer may also be formed of magnesium fluoride (MgF$_2$), instead of silicon dioxide (SiO$_2$).

According to the present invention, as is apparent from the foregoing, there is provided anti-reflection film which is excellent in spectral reflection factor and mechanical strength and which possesses improved aging and adherence properties.

What we claim is:

1. Anti-reflection film on a synthetic resin base comprising:
    a first layer selected from the group consisting of silicon dioxide (SiO$_2$) and a mixture of silicon dioxide (SiO$_2$) and alumina (Al$_2$O$_3$) deposited on said synthetic resin base by evaporation, said first layer having a geometrical film thickness of 1 to 5μ;
    a second layer formed of alumina (Al$_2$O$_3$) deposited on said first layer by evaporation, said second layer having an optical film thickness of λ/4; and
    a third layer selected from the group consisting of silicon dioxide (SiO$_2$) and magnesium fluoride (MgF$_2$) deposited on said second layer by evaporation, said third layer having an optical film thickness λ/4.

2. Anti-reflection film according to claim 1, wherein the film thickness of said first layer is 1μ, and the refractive indices of said first, second and third layers are 1.47, 1.60 and 1.46, respectively.

3. Anti-reflection film according to claim 1, wherein the film thickness of said first layer is 2μ, and the refractive indices of said first, second and third layers are 1.47, 1.60 and 1.46, respectively.

4. Anti-reflection film according to claim 1, wherein the film thickness of said first layer is 3μ, and the refractive indices of said first, second and third layers are 1.47, 1.60 and 1.46, respectively.

5. Anti-reflection film according to claim 1, wherein the film thickness of said first layer is 4μ, and the refractive indices of said first, second and third layers are 1.47, 1.60 and 1.46, respectively.

6. Anti-reflection film according to claim 1, wherein the film thickness of said first layer is 5μ, and the refractive indices of said first, second and third layers are 1.47, 1.60 and 1.46, respectively.

7. Anti-reflection film according to claim 1, further comprising a fourth layer located between said second and third layers selected from the group consisting of zirconium oxide (ZrO$_2$) and titanium dioxide (TiO$_2$), said fourth layer having an optical film thickness of λ/2, and wherein said first, said second and said fourth layers satisfy the following relation:

$$n_1 < n_2 < n_4,$$

where $n_1$, $n_2$ and $n_4$ represent the refractive indices of said first, second and fourth layers, respectively.

8. Anti-reflection film according to claim 1, wherein said first layer is a film formed of a mixture of silicon dioxide (SiO$_2$) evaporated so that its amount is decreased in the direction toward said second layer and alumina (Al$_2$O$_3$) evaporated from an evaporation source different from that of said silicon dioxide (SiO$_2$) so that its amount is increased in the direction toward said second layer.

9. Anti-reflection film according to claim 8, wherein the refractive index of that portion of said first layer which is adjacent to said base ranges from 1.47 to 1.49, the refractive index of that portion of said first layer which is adjacent to said second layer ranges from 1.45 to 1.47, the refractive index of said second layer ranges from 1.51 to 1.63, and the refractive index of said third layer is 1.46 or below.

10. Anti-reflection film on a synthetic resin base comprising:
    a first layer formed of silicon dioxide (SiO$_2$) deposited on said synthetic resin base by evaporation, said first layer having a geometrical film thickness of 1 to 5μ;
    a second layer selected from the group consisting of silicon monoxide (SiO), zirconium dioxide (ZrO$_2$) and titanium trioxide (Ti$_2$O$_3$), said second layer having an optical film thickness of λ/4;
    a third layer selected from the group consisting of zirconium oxide (ZrO$_2$) titanium trioxide (Ti$_2$O$_3$), titanium dioxide (TiO$_2$) and cerium dioxide (CeO$_2$), said third layer having an optical film thickness of λ/4; and a fourth layer selected from the group consisting of silicon dioxide (SiO$_2$) and magnesium fluoride (MgF$_2$), said fourth layer having an optical film thickness of $\lambda/4$;

said first, second, third and fourth layers satisfying the following relations:

$$n_1 < n_2 < n_3$$

and $$\frac{n_2}{n_3} = \frac{\sqrt{n_1}}{n_4} \sqrt{\frac{1-\sqrt{Ro}}{1+\sqrt{Ro}}},$$

where $n_1$, $n_2$, $n_3$ and $n_4$ represent the refractive indices of said first, second, third and fourth layers, respectively, and Ro represents the reflection factor of said anti-reflection film for a desired wavelength $\lambda$.

11. Anti-reflection film on a synthetic resin base comprising:
a first layer selected from the group consisting of silicon dioxide (SiO$_2$) and a mixture of silicon dioxide (SiO$_2$) and alumina (Al$_2$O$_3$) deposited on said synthetic resin base by evaporation, said first layer having a geometrical film thickness of 1 to 5$\mu$;
a second layer formed of alumina (Al$_2$O$_3$) deposited on said first layer by evaporation, said second layer having an optical film thickness of $\lambda/4$;
a third layer and a fourth layer each selected from the group consisting of zirconium oxide (ZrO$_2$) and titanium oxide (TiO$_2$) and each having an optical film thickness of $\lambda/4$; and
a fifth layer selected from the group consisting of silicon dioxide (SiO$_2$) and magnesium fluoride (MgF$_2$) deposited on said fourth layer by evaporation, said fifth layer having an optical film thickness of $\lambda/4$.

12. Anti-reflection film according to claim 11, wherein the film thickness of said first layer is 1$\mu$, and the refractive indices of said first, second, third, fourth and fifth layers are 1.47, 1.60, 1.94, 1.98 and 1.46, respectively.

13. Anti-reflection film according to claim 11, wherein the film thickness of said first layer is 2$\mu$, and the refractive indices of said first, second, third, fourth and fifth layers are 1.47, 1.60, 1.94, 1.98 and 1.46, respectively.

14. Anti-reflection film according to claim 11, wherein the film thickness of said first layer is 3$\mu$, and the refractive indices of said first, second, third, fourth and fifth layers are 1.47, 1.60, 1.94, 1.98 and 1.46, respectively.

15. Anti-reflection film according to claim 11, wherein the film thickness of said first layer is 4$\mu$, and the refractive indices of said first, second, third, fourth and fifth layers are 1.47, 1.60, 1.94, 1.98 and 1.46, respectively.

16. Anti-reflection film according to claim 11, wherein the film thickness of said first layer is 5$\mu$, and the refractive indices of said first, second, third, fourth and fifth layers are 1.47, 1.60, 1.94, 1.98 and 1.46, respectively.

* * * * *